United States Patent
Hsieh et al.

(10) Patent No.: US 9,886,544 B2
(45) Date of Patent: Feb. 6, 2018

(54) LAYOUT CHECKING SYSTEM AND METHOD

(71) Applicant: TAIWAN SEMICONDUCTOR MANUFACTURING CO., LTD., Hsinchu (TW)

(72) Inventors: Yao-Jen Hsieh, Taipei (TW); Kai-Ming Liu, Hsinchu (TW)

(73) Assignee: TAIWAN SEMICONDUCTOR MANUFACTURING CO., LTD., Hsinchu (TW)

( * ) Notice: Subject to any disclaimer, the term of this patent is extended or adjusted under 35 U.S.C. 154(b) by 30 days.

(21) Appl. No.: 15/051,473

(22) Filed: Feb. 23, 2016

(65) Prior Publication Data

US 2017/0242954 A1    Aug. 24, 2017

(51) Int. Cl.
*G06F 17/50* (2006.01)

(52) U.S. Cl.
CPC ...... *G06F 17/5081* (2013.01); *G06F 17/5068* (2013.01); *G06F 2217/12* (2013.01)

(58) Field of Classification Search
CPC .......... G06F 17/5068; G06F 17/5081
USPC .................... 716/55, 110, 119, 122
See application file for complete search history.

(56) References Cited

U.S. PATENT DOCUMENTS

| | | | |
|---|---|---|---|
| 6,467,074 B1 * | 10/2002 | Katsioulas | G06F 15/7867 257/207 |
| 7,873,928 B2 * | 1/2011 | Lin | G06F 17/5072 716/119 |
| 7,900,178 B2 | 3/2011 | Culp et al. | |
| 8,584,052 B2 | 11/2013 | Chen et al. | |
| 9,053,288 B1 * | 6/2015 | Hsieh | G06F 17/5081 |
| 9,396,301 B1 | 7/2016 | Lee et al. | |
| 9,613,175 B2 | 4/2017 | Hensel et al. | |
| 2008/0066027 A1 | 3/2008 | Mantik et al. | |
| 2013/0205266 A1 | 8/2013 | Chen et al. | |
| 2013/0219353 A1 * | 8/2013 | Henrickson | G06F 17/5077 716/122 |
| 2013/0320555 A1 | 12/2013 | Yu-Tseng et al. | |
| 2014/0101623 A1 | 4/2014 | Chen et al. | |
| 2014/0215428 A1 * | 7/2014 | Chen | G06F 17/5081 716/131 |
| 2015/0121317 A1 | 4/2015 | Lee et al. | |
| 2017/0053057 A1 * | 2/2017 | Riviere-Cazaux | G03F 7/70433 |

FOREIGN PATENT DOCUMENTS

| | | | |
|---|---|---|---|
| KR | 10-2012-0071302 A | 7/2012 | |
| KR | 10-2015-0113803 A | 10/2015 | |
| KR | 10 2016 0012864 A | 2/2016 | |
| TW | 200951749 A1 | 12/2009 | |
| TW | 201531873 A | 8/2015 | |

* cited by examiner

*Primary Examiner* — Stacy Whitmore

(74) *Attorney, Agent, or Firm* — Maschoff Brennan

(57) ABSTRACT

A method includes the operation below. Groups, indicating layout patterns of interconnection layers, are assigned to a circuit, to determine layout constraints of the circuit. Layout patterns are extracted from a layout design for the circuit. The layout patterns are compared with the layout constraints. Data, indicating the layout design, for fabrication of the circuit are generated in a condition that the layout patterns meet the layout constraints.

20 Claims, 12 Drawing Sheets

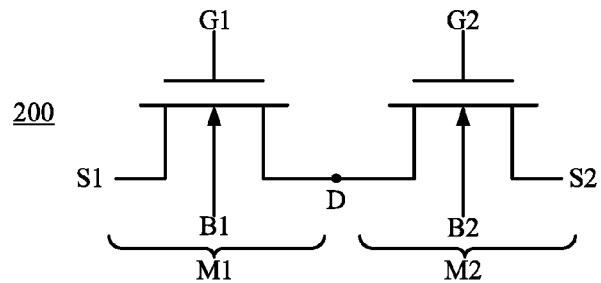
FIG. 2A
```
         .subckt 200 D G1 G2 S1 S2 B1 B2          ~ 221
220      M1 D G1 S1 B1 nch W=3 L=1
         M2 D G2 S2 B2 nch W=3 L=1                ~ 222
         .ends                                    ~ 223
```
FIG. 2B
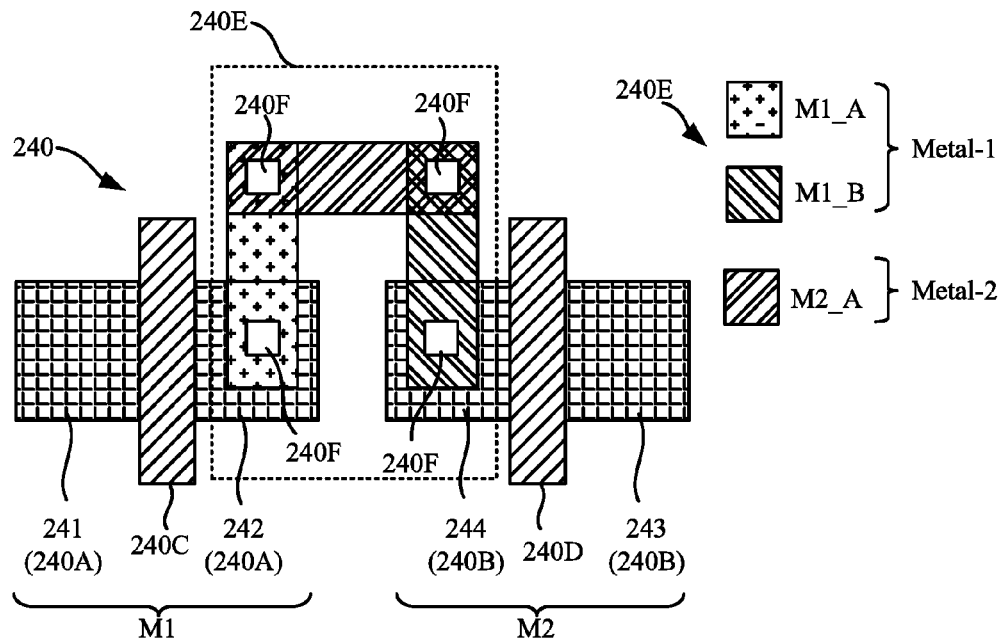
FIG. 2C

LAYOUT CHECKING SYSTEM AND METHOD

BACKGROUND

In semiconductor fabrication processes, a single layer is sometimes formed by multiple-layout patterns to increase a spatial resolution of the layer. Each of multiple-layout patterns is assigned to different groups. Such assignment is performed by a circuit designer, or a layout designer, for example, by executing a software program.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 2A is a schematic diagram of a circuit in accordance with various embodiments of the present disclosure;

FIG. 2B illustrates a predetermined description in a netlist file, indicating of the circuit in FIG. 2A, in accordance with some embodiments of the present disclosure;

FIG. 2C is a schematic diagram illustrating a layout design corresponding to the circuit in FIG. 2A, in accordance with various embodiments of the present disclosure;

DETAILED DESCRIPTION

Figure 1:
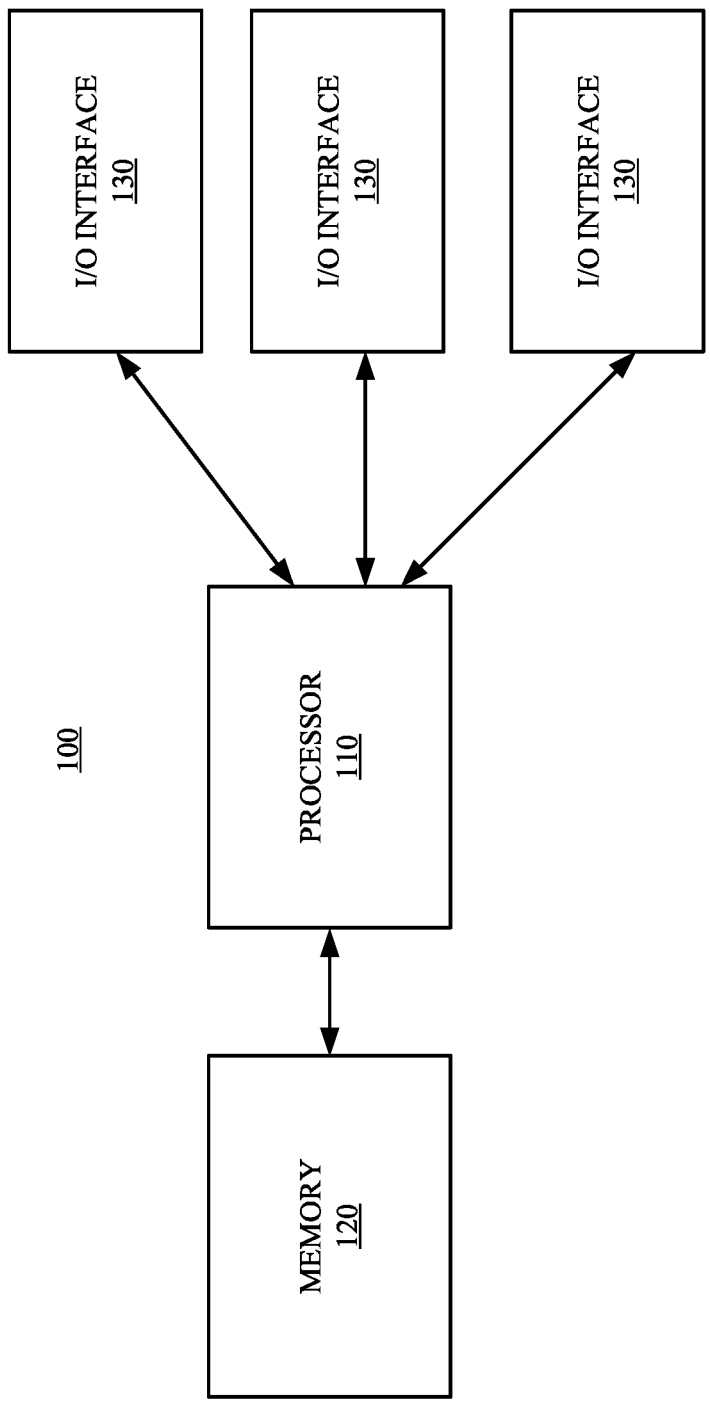
FIG. 1 is a schematic diagram of a design system, in accordance with various embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

The terms used in this specification generally have their ordinary meanings in the art and in the specific context where each term is used. The use of examples in this specification, including examples of any terms discussed herein, is illustrative only, and in no way limits the scope and meaning of the disclosure or of any exemplified term. Likewise, the present disclosure is not limited to various embodiments given in this specification.

Although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments. As used herein, the term "and/or" includes any and all combinations of one or more of the associated listed items.

FIG. 1 is a schematic diagram of a design system 100, in accordance with some embodiments of the present disclosure.

As illustratively shown in FIG. 1, the design system 100 includes a processor 110, a memory 120, and Input/Output (I/O) interfaces 130. The processor 110 is coupled to the memory 120 and the I/O interfaces 130. In various embodiments, the processor 110 is a central processing unit (CPU), an application specific integrated circuit (ASIC), a multi-processor, a distributed processing system, or a suitable processing unit. Various circuits or units to implement the processor 110 are within the contemplated scope of the present disclosure.

The memory 120 stores one or more program codes for aiding design of integrating circuits. For illustration, the memory 120 stores a program code encoded with a set of instructions for checking layout patterns of the integrating circuits. The processor 110 is able to execute the program codes stored in the memory 120, and the operations of layout checking are able to be automatically performed.

In some embodiments, the memory 120 is a non-transitory computer readable storage medium encoded with, i.e., storing, a set of executable instructions for checking layout patterns. For illustration, the memory 120 stores executable instructions for performing operations including, for example, operation S340 illustrated in FIG. 4. In some embodiments, the computer readable storage medium is an electronic, magnetic, optical, electromagnetic, infrared, and/or a semiconductor system (or apparatus or device). For example, the computer readable storage medium includes a semiconductor or solid-state memory, a magnetic tape, a removable computer diskette, a random access memory (RAM), a read-only memory (ROM), a rigid magnetic disk, and/or an optical disk. In one or more embodiments using optical disks, the computer readable storage medium includes a compact disk-read only memory (CD-ROM), a compact disk-read/write (CD-R/W), and/or a digital video disc (DVD).

The I/O interfaces 130 receive inputs or commands from various control devices, which, for example, are operated by a circuit designer and/or a layout designer. Accordingly, the design system 100 is able to be manipulated with the inputs or commands received by the I/O interfaces 130. In some embodiments, the I/O interfaces 130 include a display configured to display the status of executing the program code. In some embodiments, the I/O interfaces 130 include a graphical user interface (GUI). In some other embodiments, the I/O interfaces 130 include a keyboard, keypad, mouse, trackball, track-pad, touch screen, cursor direction keys, or the combination thereof, for communicating information and commands to processor 110.

FIG. 2A is a schematic diagram of a circuit 200 in accordance with some embodiments of the present disclosure. In order to facilitate the illustration of a layout checking method 300 of FIG. 3, various terms or components regarding layout patterns are introduced with reference to FIG. 2A.

The circuit 200 includes a switch M1 and a switch M2. For example, in some embodiments, the switch M1 and the switch M2 are implemented with N-type metal oxide silicon field transistors (MOSFETs). The switch M1 includes four terminals defined as a gate (labeled as G1), a drain (labeled as D), a source (labeled as S1), and a bulk (labeled as B1). Similarly, the switch M2 includes four terminals defined as a gate (labeled as G2), a drain (labeled as D), a source (labeled as S2), and a bulk (labeled as B2). As illustratively shown in FIG. 2A, the terminal D of the switch M1 is coupled to the terminal D of the switch M2.

Reference is now made to both of FIG. 2A and FIG. 2B. FIG. 2B illustrates a description in a netlist file 220, indicating of the circuit 200 in FIG. 2A, in accordance with some embodiments of the present disclosure. In some embodiments, a circuit designer is able to design the circuit 200 by describing the circuit 200 through the netlist file 220. In some embodiments, the contents of the netlist file 220 are in compliance with a predetermined type of syntax, which is able to record and/or design a circuit in a descriptive format recognizable by the design system 100. In some embodiments, the predetermined type of syntax is BERKELEY SPICE syntax. In some other embodiments, the predetermined type of syntax is HSPICE syntax.

As illustratively show in FIG. 2B, the description of the netlist file 220 includes portions 221-223. The portion 221, using the statement of ".subckt", and the portion 223, using the statement of ".ends", to declare a circuit named as "200" and its terminals D, G1, G2, S1, S2, B1, and B2. The portion 222 further declares that the circuit 200 includes two N-type transistors M1 and M2 (i.e., switches M1 and M2 in FIG. 2A), by using the parameter "nch," and their connections and sizes, by using the parameters "W=3" and "L=1." In some embodiments, the circuit designer is able to build and/or edit the netlist file 220 via the design system 100. In some embodiments, the memory 120 stores one or more program codes that are executed to perform circuit simulations and analysis according to the netlist file 220.

The circuit 200 in FIG. 2A is given for illustrative purposes. Various circuits or semiconductor devices for layout design are within the contemplated scope of the present disclosure. Correspondingly, the description in the netlist file 220 in FIG. 2B and layout design described below are given for illustrative purposes as well.

Reference is now made to FIG. 2C. FIG. 2C is a schematic diagram illustrating a layout design 240 corresponding to the circuit 200 in FIG. 2A, in accordance with some embodiments of the present disclosure.

In some embodiments, the layout design 240 includes multiple-layout patterns corresponding to semiconductor layers or metal layers in fabrication. For illustration, as shown in FIG. 2C, the multiple-layout patterns includes oxide definition (OD) regions 240A-240B, gate regions 240C-240D, interconnection layers 240E, and via plugs 240F. The gate region 240C corresponds to the gate G1 of the switch M1, and the gate region 240D corresponds to the gate G2 of the switch M2. The region 240A includes two portions 241 and 242 at two sides of the gate region 240C, as illustrated in FIG. 2C. The portion 241 of the OD region 240A corresponds to the source S1 of the switch M1. The portion 242 of the OD region 240A corresponds to the drain D of the switch M1. Furthermore, the region 240B includes two portions 243 and 244 at two sides of the gate region 240D, as illustrated in FIG. 2C. The portion 243 of the OD region 240B corresponds to the source S1 of the switch M2. The portion 244 of the OD region 240B corresponds to the drain D of the switch M2. The interconnection layers 240E and the via plugs 240F are formed to electrically couple the drain D of the switch M1 to the drain D of the switch M2.

In some embodiments, the interconnection layers 240E are formed with one or more metal layers. For illustration, the interconnection layers 240E include a metal layer Metal-1 and a metal layer Metal-2. Each of the metal layer Metal-1 and the metal layer Metal-2 is formed with multiple groups of layer patterns. For illustration in FIG. 2C, the layout patterns for the metal layer Metal-1 are assigned to group M1_A and group M1_B, in which the group M1_A and the group M1_B are mutually exclusive. For example, the metal layer Metal-1 is fabricated using double-patterning technology. The metal layer Metal-1 is formed with two separate groups M1_A and M1_B. In some embodiments, the layout patterns, corresponding to the groups M1_A and M1_B of the metal layer Metal-1, are formed on different masks. The layout patterns for the metal layer Metal-2 are assigned to group M2_A. In various embodiments, the design system 100 utilizes different color patterns to present the group M1_A, the group M1_B, and the group M2_A.

In some applications, the layout design 240 is designed under some design rules. For example, a minimum distance between two lines, which are formed with the same group of the metal layer, is limited. Therefore, in order to reduce the area of the circuit 200 in FIG. 2A, the terminal D of the switch M1 is coupled, using a different group of the metal layer, to the switch M2. Moreover, the terminal D of the switch M2 is coupled, using a different group of the metal layer, to the switch M1. For illustration, as shown in FIG. 2C, the terminal D of the switch M1 is coupled, using the group M1_A of the metal layer Metal-1, to the terminal D of the switch M2. The terminal D of the switch M2 is coupled, using the group M1_B of the metal layer Metal-1, to the terminal D of the switch M1.

In various embodiments, at least one of the I/O interfaces 130 in FIG. 1 receives the netlist file 220 in FIG. 2B. In some embodiments, a circuit designer and/or a layout designer are able to provide layout constraints for the circuit 200 in FIG. 2A via at least one of the I/O interfaces 130 in FIG. 1. In some embodiments, the layout constraints specify how the multiple-layout patterns of one or more of terminals in the layout design 240 in FIG. 2C would be assigned. In some embodiments, the processor 110 cooperates with the memory 120 in FIG. 1, based on the received netlist file 220 and the layout constraints. Accordingly, the design system 100 is able to compare the multiple-layout patterns in the layout design 240 in FIG. 2C with the layout constraints, to check whether the layout design 240 meets the arrangement as illustrated in FIG. 2C.

The arrangements of the layout patterns in FIG. 2C, corresponding to the circuit 200 in FIG. 2A, are given for illustrative purposes. Various arrangements of the layout patterns are within the contemplated scope of the present disclosure.

In some embodiments, at least one group of the layout patterns is assigned to at least one of the terminals of the circuit 200 in FIG. 2A. In some embodiments, the terminals of the circuit 200 are defined in the netlist file 220 in FIG. 2B. In some embodiments, each terminal of the circuit 200 is formed with at least one terminal of one or more devices, elements, and/or other suitable semiconductor components. For illustration, as shown in FIG. 2A, the terminal D of the circuit 200 is formed with the drain terminals D of two switches M1 and M2.

The aforementioned definitions and/or arrangements of the terminals of the circuit are given for illustrative purposes only. Various definitions and/or arrangements of the terminals of the circuit are within the contemplated scope of the present disclosure.

Figure 3:
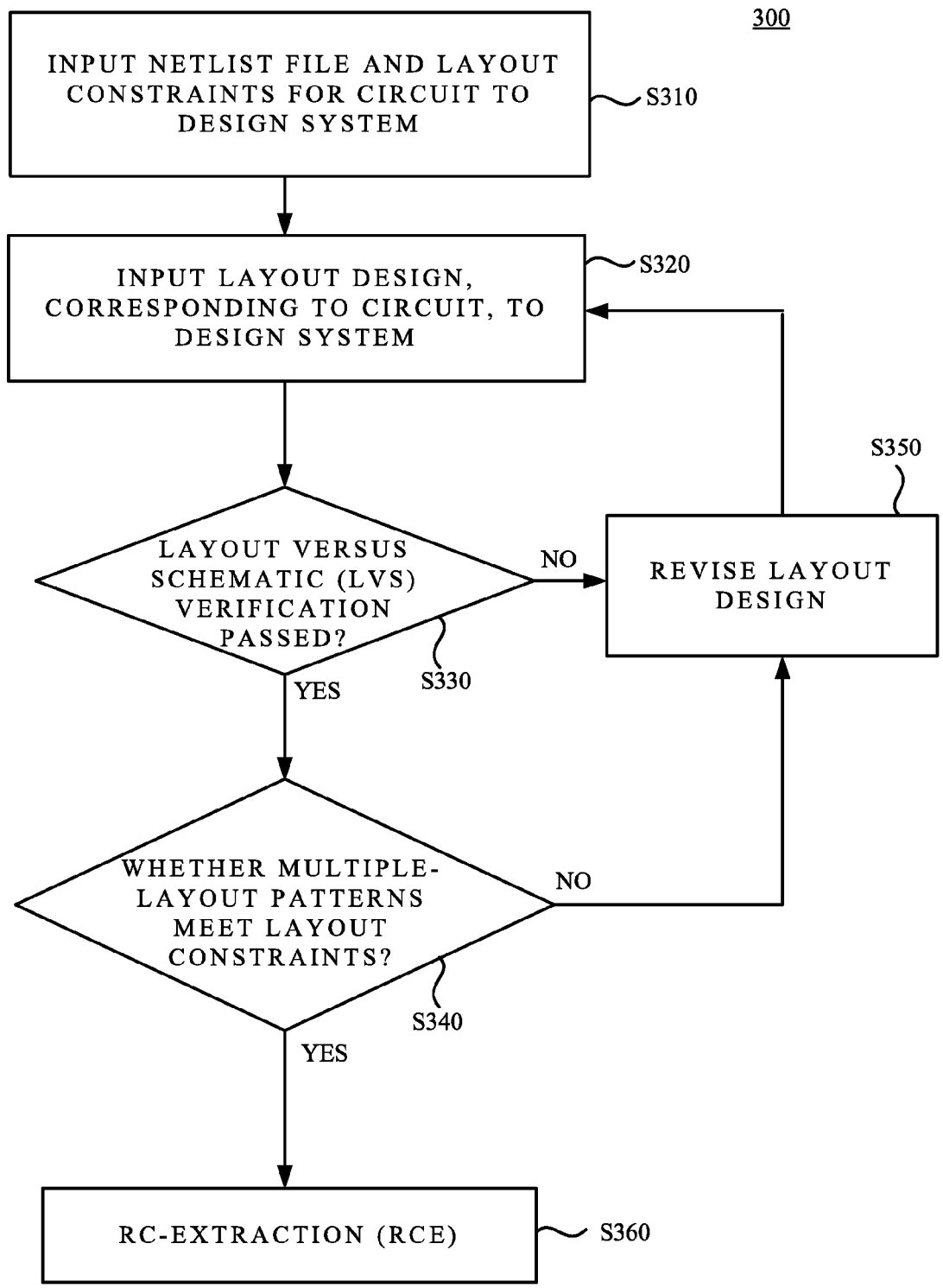
FIG. 3 is a flow chart of a design method using the design system in FIG. 1, in accordance with various embodiments of the present disclosure.

Reference is now made to FIG. 3. FIG. 3 is a flow chart of a design method 300 using the design system 100 in FIG. 1, in accordance with some embodiments of the present disclosure. For ease of understanding, as an example, the design method 300 is described below with reference to FIG. 1 and FIGS. 2A-2C. The design method 300 is also able to be applied to other embodiments of the present disclosure, including, for example, the embodiments in FIGS. 5A-11B.

The design method 300 includes operations S310-S360. In operation S310, the netlist file and layout constraints for the circuit are inputted to the design system. For illustration, the netlist file 220 in FIG. 2B and the layout constraints for the circuit 200 in FIG. 2A are inputted to the design system 100 in FIG. 1.

In some embodiments, the circuit 200 is described in the netlist file 220 through various circuit simulation tools carried in the design system 100. In various embodiments, a predetermined description including layout constraints for the circuit 200 is determined through various circuit simulation tools and/or electronic design automation (EDA) tools carried in the design system 100. For illustration, the layout constraints are defined in a predetermined description, which includes, for example, 500 in FIG. 5A, 600 in FIG. 6A, 700 in FIG. 7A, 800 in FIG. 8A, 900 in FIG. 9A, 1000 in FIG. 10A, and 1100 in FIG. 11A below.

In operation S320, the layout design corresponding to the circuit is determined and is inputted to the design system. For illustration, the layout design 240 in FIG. 2C corresponding to the circuit 200 in FIG. 2A is determined and is inputted to the design system 100 in FIG. 1. In some embodiments, the layout design 240 is manually designed by a layout designer through the EDA tools carried in the design system 100. In various embodiments, the layout design 240 is generated from an auto place and route (APR) tool carried in the design system 100 according to the netlist file 220.

In operation S330, the design system determines whether a layout versus schematic (LVS) verification is passed. For illustration, the design system 100 in FIG. 1 performs a layout versus schematic (LVS) verification to check whether the layout design 240 in FIG. 2C are consistent with the circuit 200 in FIG. 2A. If yes, operation S340 is performed. Otherwise, operation S350 is performed. In some embodiments, the LVS verification is performed through the EDA tool carried in the design system 100.

In some embodiments, the LVS verification includes following operations. The design system 100 extracts the connections of the circuit 200 from the netlist file 220, and extracts the multiple-layout patterns from the layout design 240. The design system 100 then determines whether the circuit formed according to the multiple-layout patterns is consistent with the connections of the circuit 200. If the circuit formed according to the multiple-layout patterns is consistent with the connections of the circuit 200, the processor 110 determines that the LVS verification is passed. Otherwise, the processor 110 determines that the LVS verification is not passed.

If the LVS verification is passed, in operation S340, the processor determines whether the multiple-layout patterns meet the layout constraints. If yes, operation S360 is performed. Otherwise, operation S350 is performed. For illustration, the processor 110 in FIG. 1 executes program codes to extract layout patterns of the circuit 200 from the layout design 240 in FIG. 2C. In some embodiments, the layout patterns include one or more interconnection layers in the layout design 240. The processor 110 then compares the layout patterns of the circuit 200 with the layout constraints, to determine whether the layout patterns meet the layout constraints. The related operations will be described below with reference to FIG. 4.

If the multiple-layout patterns do not meet the layout constraints, in operation S350, the layout design corresponding to the circuit is revised, in order to pass the LVS verification in operation S330 and/or to meet the layout constraints in operation S340. After operation S350 is performed, the processor 110 returns to perform operation S320. For illustration, when the layout patterns, extracted from the layout design 240 in FIG. 2C, do not meet the layout constraints, the layout design 240 is revised, to pass the LVS verification and/or to meet the layout constraints.

If the multiple-layout patterns meet the layout constraints, in operation S360, the design system performs an "RC-extraction" (RCE) to analyze the circuit with parasitic effects. For illustration, after the layout constraints are met, the design system 100 in FIG. 1 is able to perform the RCE to analyze the circuit the circuit 200 in FIG. 2A through the EDA tool carried in the design system 100.

In some embodiments, the RCE includes following operations. The design system 100 extracts parasitic components of the circuit 200 from the multiple-layout patterns. The design system 100 then performs circuit simulations and analysis according to the netlist file 220 and the parasitic components. In some embodiments, the EDA tool extracts the parasitic components including, for example, capacitances, resistances, and inductances, within layers of the layout design 240. Accordingly, at least one parasitic effect in the circuit 200 is able to be calculated.

In some embodiments, after operation S340 is performed, when the multiple-layout patterns meet the layout constraints, the processor 110 generates data, indicating the layout design 240 in FIG. 2C. In further embodiments, the data, indicating the layout design 240 in FIG. 2C, are able to be utilized for at least one tool performing semiconductor process of fabricating the circuit 200 based on the multiple-layout patterns the layout design 240 in FIG. 2C. In some embodiments, the at least tool discussed above includes one or more semiconductor manufacturing equipments for performing semiconductor fabrication on wafer.

One of ordinary skill in the art would recognize that an order of operations in the method 300 is adjustable. One of ordinary skill in the art would further recognize that additional operations are able to be included in the design method 300 without departing from the scope of the present disclosure.

Figure 5A:
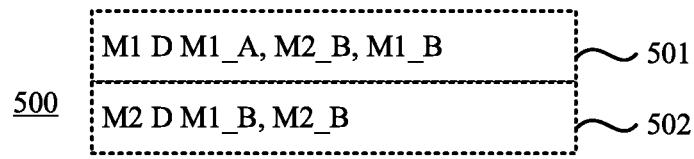
FIG. 5A illustrates a predetermined description including layout constraints for the circuit in FIG. 2A, in accordance with various embodiments of the present disclosure.
Figure 5B:
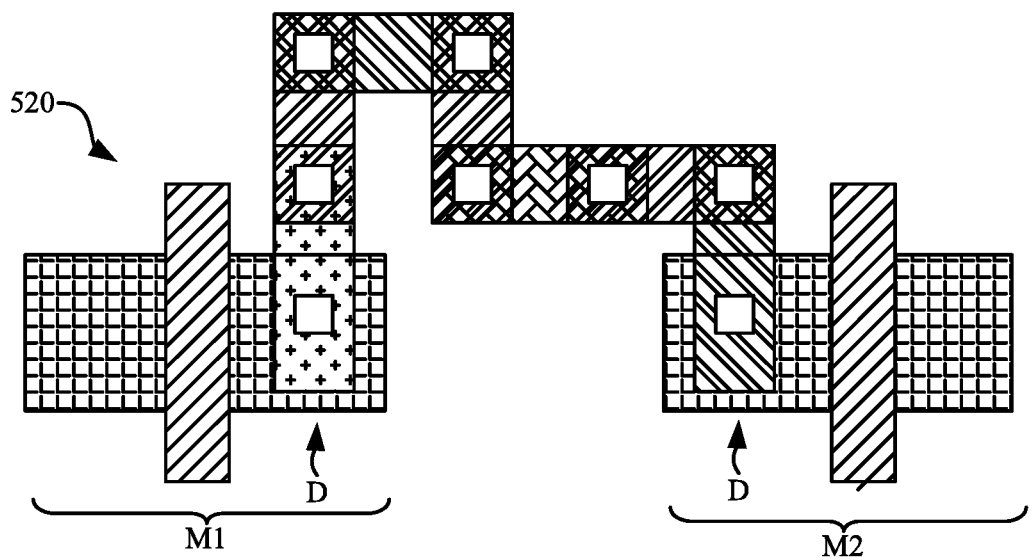
FIG. 5B is a schematic diagram illustrating a layout design corresponding to the circuit in FIG. 2A, and layout patterns of the layout design, in accordance with various embodiments of the present disclosure.
Figure 5B:
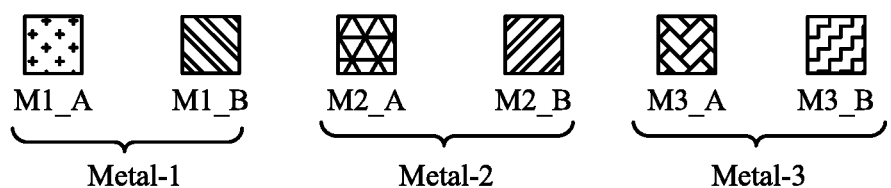
Figure 5B:
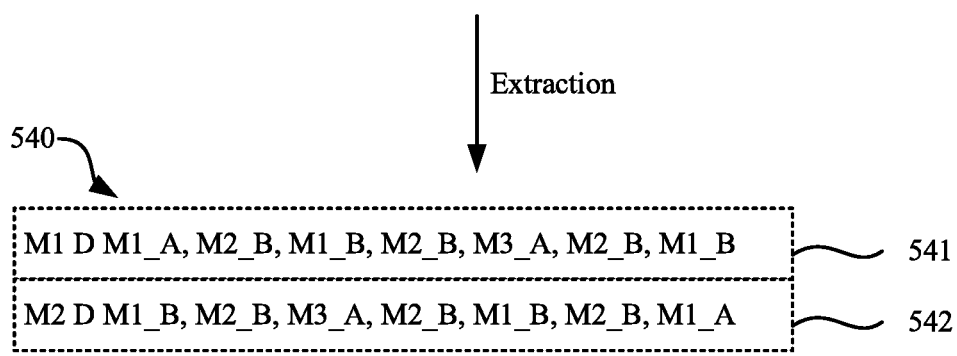

For ease of understanding, as an example, the design method 300 is described with reference to FIG. 5B below. In some embodiments, the design method 300 is applicable to multiple-layout patterns having numerous interconnection layers, in which each of the interconnection layers is assigned to multiple groups. For illustration, the interconnection layers include metal layers Metal-1, Metal-2, and Metal-3, as illustrated in FIG. 5B below. The metal layer Metal-1 is assigned to the group M1_A and the group M1_B. The metal layer Metal-2 is assigned to the group M2_A and a group M2_B. The metal layer Metal-3 is assigned to the group M3_A and a group M3_B.

For illustration, following embodiments are described with the metal layers Metal-1, Metal-2, and Metal-3, but the present disclosure is not limited in this regard. The number and configuration of the interconnection layers and the groups in following embodiments are given for illustrative purposes. Various numbers and configurations of the interconnection layers and the groups in following embodiments are within the contemplated scope of the present disclosure.

Figure 4:
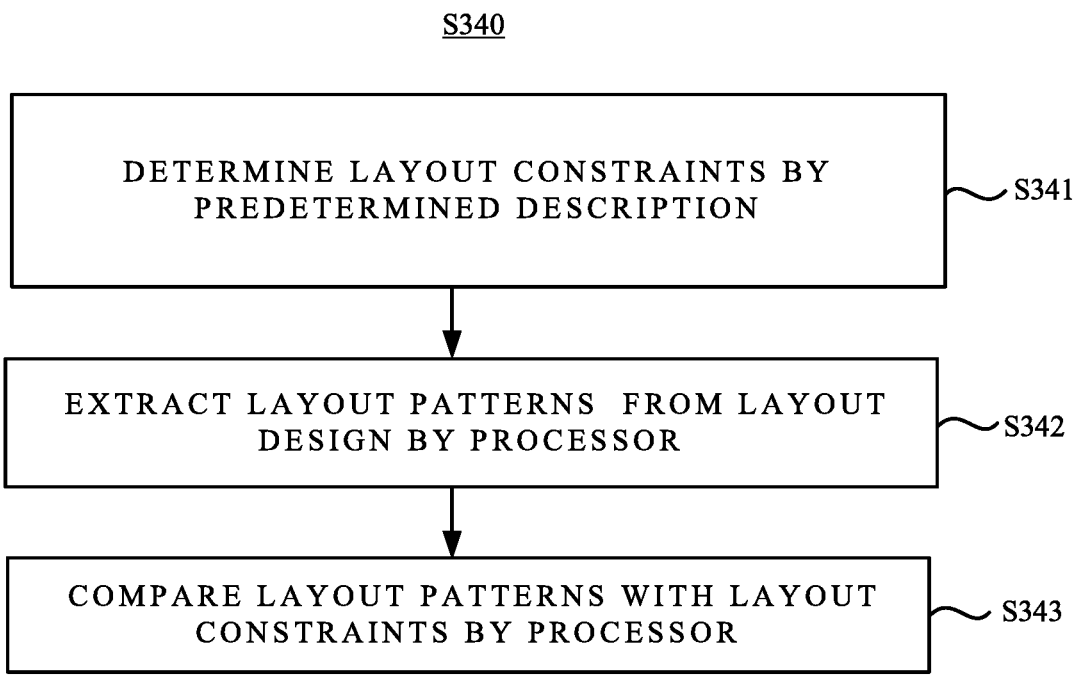
FIG. 4 is a flow chart of an operation of method in FIG. 3, in accordance with various embodiments of the present disclosure.

FIG. 4 is a flow chart of operation S340 of method 300 in FIG. 3, in accordance with some embodiments of the present disclosure. FIG. 5A illustrates a predetermined description 500 including layout constraints for the circuit 200 in FIG. 2A, in accordance with some embodiments of the present disclosure. FIG. 5B is a schematic diagram illustrating a layout design 520 corresponding to the circuit 200 in FIG. 2A, and layout patterns 540 of the layout design 520, in accordance with some embodiments of the present disclosure. Operations included in the operation S340 in FIG. 4 are described below with reference to FIG. 5A-5B.

The operation S340 includes sub-operations S341-S343. In sub-operation S341, the layout constraints are determined by the predetermined description. For illustration, in some embodiments, the contents of the predetermined description 500 in FIG. 5A are in a form able to be in compliance with a predetermined type of syntax.

As shown in FIG. 5A, the predetermined description 500 includes two coding portions 501 and 502. The coding portion 501 is configured to assign, in a predetermined sequence, the groups of the interconnection layers to the terminal D of the switch M1. In other words, the coding portion 501 specifies the layout constraints for the terminal D of the switch M1. For illustration, the coding portion 501 specifies that the terminal D of the switch M1 is sequentially coupled to the group M1_A, the group M2_B, and the group M1_B. With such constraints, the terminal D of the switch M1 is expected to be coupled to the group M1_A, and coupled to the group M2_B through the group M1_A, and further coupled to the group M1_B through the group M1_A and the group M2_B.

The coding portion 502 is configured to assign, in a predetermined sequence, the groups of the interconnection layers to the terminal D of the switch M2. In other words, the coding portion 502 specifies the layout constraints for the terminal D of the switch M2. For illustration, the coding portion 502 specifies that the terminal D of the switch M2 is sequentially coupled to the group M1_B and the group M2_B. With such constraints, the terminal D of the switch M2 is expected to be coupled to the group M1_B, and coupled to the group M2_B through the group M1_B.

With continued reference to FIG. 4, in sub-operation S342, the processor extracts layout patterns from the layout design. In sup-operation S343, the processor compares the layout patterns with the layout constraints. For illustration, the processor 110 in FIG. 1 extracts the layout patterns 540 in FIG. 5B from the layout design 520 in FIG. 5B, and then compares the layout patterns 540 with the layout constraints defined in the predetermined description 500 in FIG. 5A.

In some embodiments, the layout patterns 540 include the interconnection layers coupled between the switches M1 and M2 in the layout design 520. For illustration, as shown in FIG. 5B, the processor 110 sequentially extracts the groups of the interconnection layers connected from the terminal D of the switch M1 to the terminal D of the switch M2, as illustrated in a portion 541 of the layout patterns 540. The terminal D of the switch M1 is coupled to the terminal D of the switch M2 through the groups M1_A, M2_B, M1_B, M2_B, M3_A, M2_B, and M1_B in sequence. The processor 110 also extracts the groups of the interconnection layers connected from the terminal D of the switch M2 to the terminal D of the switch M1, as illustrated in a portion 542 of the layout patterns 540.

Furthermore, the processor 110 compares the portion 541 in FIG. 5B with the coding portion 501 in FIG. 5A. For illustration, in the coding portion 501, the group M1_A is followed by the group M2_B, and the group M2_B is followed by the group M1_B. In the portion 541, the group M1_A is also followed by the group M2_B, and the group M2_B is also followed by the group M1_B. In comparison, the sequence of the corresponding layout patterns described in the portion 541 is consistent with the sequence of corresponding groups described in the coding portion 501. Accordingly, the processor 110 determines that the portion 541 of the layout patterns 540 for the switch M1 meets the layout constraints because the sequence of the groups in the portion 541 is the same as that of the groups in the coding portion 501.

The processor 110 also compares the portion 542 in FIG. 5B with the coding portion 502 in FIG. 5A. For illustration, in the coding portion 502, the group M1_B is followed by the group M2_B. In the portion 542, the group M1_B is also followed by the group M2_B. In comparison, the sequence of the corresponding layout patterns described in the portion 542 is consistent with the sequence of corresponding groups described in the coding portion 502. Accordingly, the processor 110 determines that the portion 542 of the layout patterns 540 for the switch M2 meets the layout constraints because the sequence of the groups in the portion 542 is the same as that of the groups in the coding portion 502.

Figure 6A:
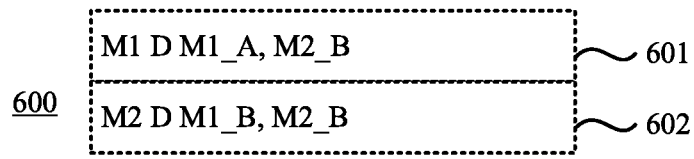
FIG. 6A illustrates a predetermined description including layout constraints for the circuit in FIG. 2A, in accordance with various embodiments of the present disclosure.
Figure 6B:
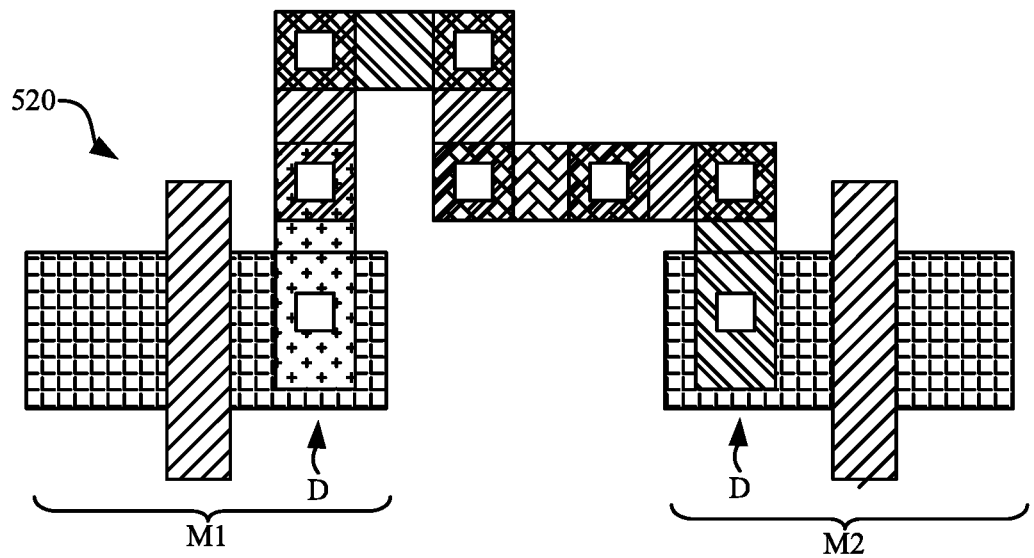
FIG. 6B is a schematic diagram illustrating the layout design in FIG. 5B and layout patterns of the layout design, in accordance with various embodiments of the present disclosure.
Figure 6B:
Figure 6B:
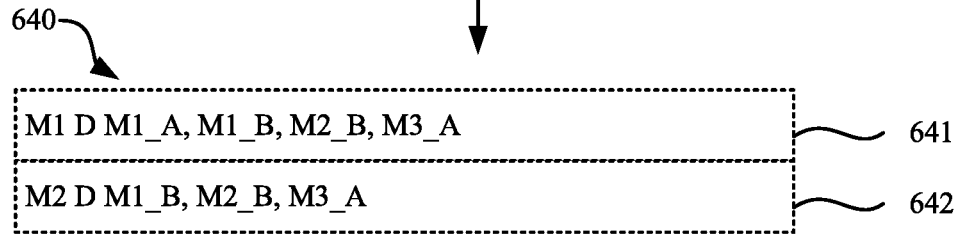

Reference is now made to FIG. 6A and FIG. 6B. FIG. 6A illustrates a predetermined description 600 including layout constraints for the circuit 200 in FIG. 2A, in accordance with various embodiments of the present disclosure. FIG. 6B is a schematic diagram illustrating the layout design 520 in FIG. 5B, and layout patterns 640 of the layout design 520, in accordance with various embodiments of the present disclosure.

In some embodiments, the layout constraints are configured to assign the interconnection layers to the terminal D of the switch M1 and the terminal D of the switch M2, respectively, according to the numerical order of the interconnection layers. For illustration, as shown in FIG. 6A, the predetermined description 600 includes two coding portions 601 and 602. The coding portion 601 assigns, in ascending numerical order, the groups of the interconnection layers to the terminal D of the switch M1. For example, the coding portion 601 assigns Metal-1, then Metal-2, then Metal-3, and so on. The coding portion 602 similarly assigns, in ascending numerical order, the groups of the interconnection layers to the terminal D of the switch M2.

For illustration in FIG. 6A, the group M1_A and the group M2_B are sequentially assigned to the terminal D of the switch M1. The group M1_B and the group M2_B are sequentially assigned to the terminal D of the switch M2.

Furthermore, in some embodiments, the processor 110 extracts the layout patterns 640 from the layout design 520 in ascending numerical order. For example, the processor 110 extracts Metal-1, then Metal-2, then Metal-3, and so on. For illustration, as shown in FIG. 6B, the processor 110 determines that the top group of the interconnection layer on the terminals D of both of the switches M1 and M2 is M3_A. The processor 110 then extracts the groups of the interconnection layers connected from the terminal D of the switch M1 to the top group M3_A in ascending numerical order, as illustrated in a portion 641 of the layout patterns 640. The terminal D of the switch M1 is coupled to the top group M3_A through the groups M1_A, M2_B, M1_B, and M2_B. The processor 110 thus sorts these groups in ascending numerical order as illustrated in the portion 641 according to the numerical order of the metal layers Metal-1-Metal-3.

The processor 110 also generates a portion 642 of the layout patterns 640 by extracting the groups of the interconnection layers connected from the terminal D of the switch M2 to the top group M3_A in ascending numerical order. Accordingly, the processor 110 is able to compare the coding portions 601 and 602 in FIG. 6A with the portions 641 and the 642 in FIG. 6B, respectively, to check whether the layout design 520 meets the layout constraints.

For illustration, in the coding portion 601, the group M1_A is followed by the group M2_B. In the portion 641, the group M1_A is also followed, through the group M1_B, by the group M2_B. Accordingly, the processor 110 determines that the portion 641 of the layout patterns 640 for the switch M1 meets the layout constraints because the sequence of the groups in the portion 641 is the same as that of the groups in the coding portion 601.

For another illustration, in the coding portion 602, the group M1_B is followed by the group M2_B. In the portion 642, the group M1_B is also followed by the group M2_B. Accordingly, the processor no determines that the portion 642 of the layout patterns 640 for the switch M2 meets the layout constraints because the sequence of the groups in the portion 642 is the same as that of the groups in the coding portion 602.

Figure 7A:
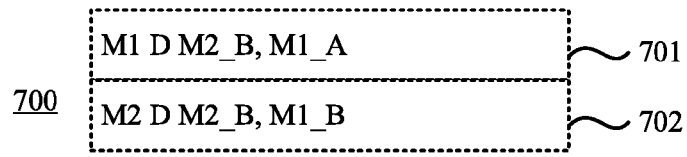
FIG. 7A illustrates a predetermined description including layout constraints for the circuit in FIG. 2A, in accordance with alternative embodiments of the present disclosure.
Figure 7B:
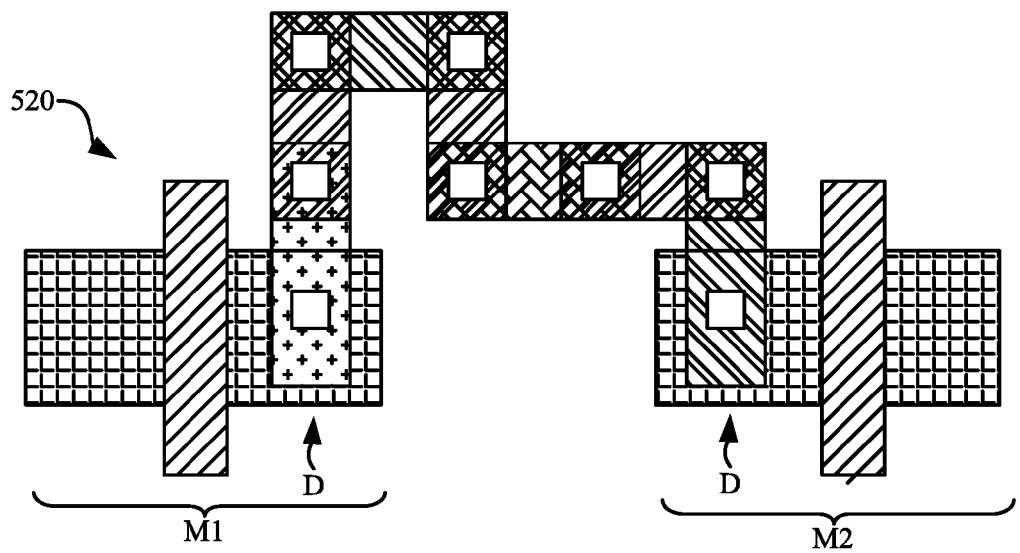
FIG. 7B is a schematic diagram illustrating the layout design in FIG. 5B and layout patterns of the layout design, in accordance with alternative embodiments of the present disclosure.
Figure 7B:
Figure 7B:
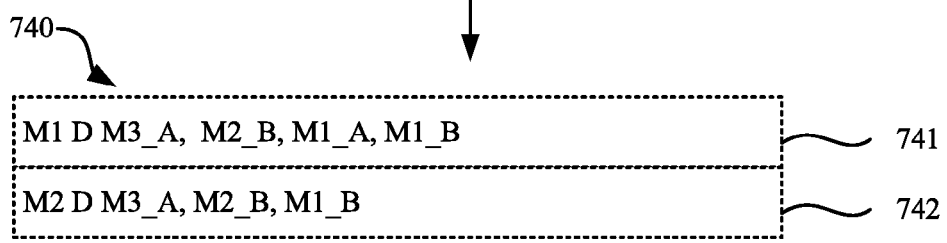

Reference is now made to FIG. 7A and FIG. 7B. FIG. 7A illustrates a predetermined description 700 including layout constraints for the circuit 200 in FIG. 2A, in accordance with alternative embodiments of the present disclosure. FIG. 7B is a schematic diagram illustrating the layout design 520 in FIG. 5B, and layout patterns 740 of the layout design 520, in accordance with alternative embodiments of the present disclosure.

Compared with FIGS. 6A-6B, in some embodiments, a coding portion 701 of the predetermined description 700 assigns, in descending numerical order, the groups of the interconnection layers to the terminal D of the switch M1. For example, the coding portion 701 assigns Metal-3, then Metal-2, then Metal-1, and so on. A coding portion 702 of the predetermined description 700 similarly assigns, in descending numerical order, the groups of the interconnection layers to the terminal D of the switch M2.

For illustration in FIG. 7A, the group M2_B and the group M1_A are sequentially assigned to the terminal D of the switch M1. The group M2_B and the group M1_B are sequentially assigned to the terminal D of the switch M2. As shown in FIG. 7B, the processor 110 extracts the groups connected from the top group M3_A to the terminal D of the switch M1. Then, the processor 110 sorts the groups in the layout patterns in descending numerical order, as illustrated in a portion 741 of the layout patterns 740. The processor 110 further extracts the groups in the layout patterns connected from the top group M3_A to the terminal D of the switch M2. Then, the processor 110 sorts the groups in the layout patterns in descending numerical order, as illustrated in a portion 742 of the layout patterns 740. As a result, the processor 110 is able to compare the coding portions 701 and 702 in FIG. 7A with the portions 741 and 742 in FIG. 7B, respectively, to check whether the layout design 520 meets the layout constraints. The manner to check whether the layout design 520 meets the layout constraints, regarding FIG. 7A and FIG. 7B, are similar to that discussed above, and thus it is not further detailed herein.

The predetermined sequences, including the ascending numerical order and/or the descending numerical order, are given for illustrative purposes only. Various kinds of orders are within the contemplated scope of the present disclosure.

Figure 8A:
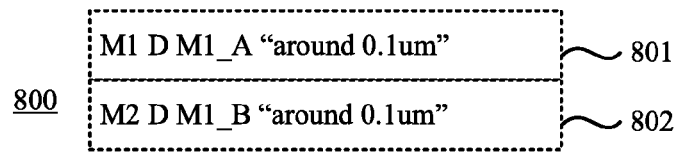
FIG. 8A illustrates a predetermined description including layout constraints for the circuit in FIG. 2A, in accordance with some other embodiments of the present disclosure.
Figure 8B:
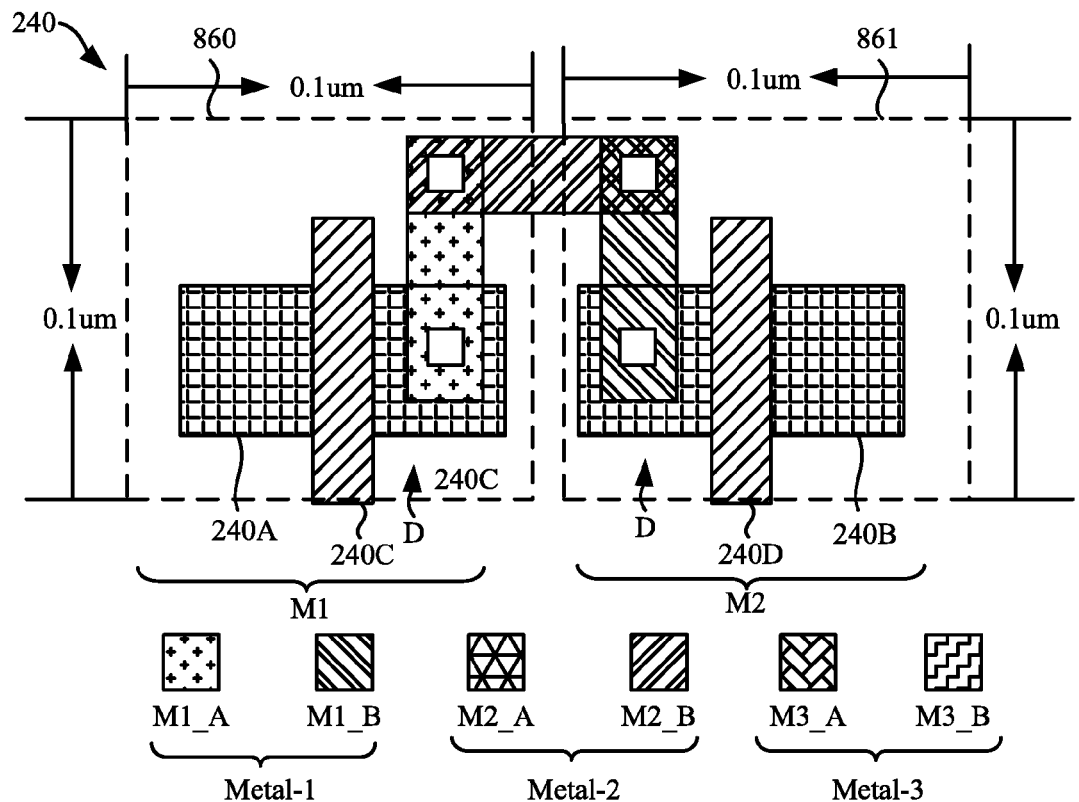
FIG. 8B is a schematic diagram illustrating the layout design in FIG. 2C in FIG. 5 and layout patterns of the layout design, in accordance with some other embodiments of the present disclosure.
Figure 8B:
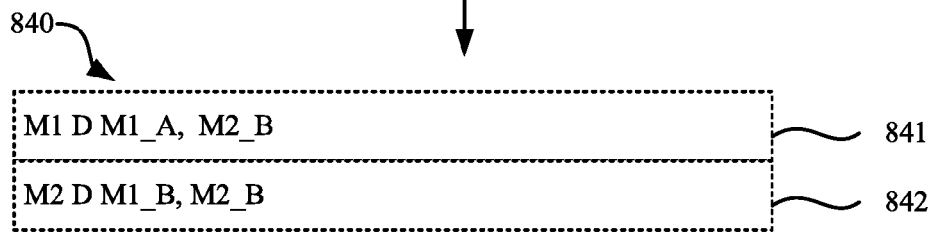

Reference is now made to FIG. 8A and FIG. 8B. FIG. 8A illustrates a predetermined description 800 including layout constraints for the circuit 200 in FIG. 2A, in accordance with some other embodiments of the present disclosure. FIG. 8B is a schematic diagram illustrating the layout design 240 in FIG. 2C, and layout patterns 840 of the layout design 240, in accordance with some other embodiments of the present disclosure.

In some embodiments, the layout constraints are configured to assign, within a region 860 as illustrated in FIG. 8B, a group of one of the interconnection layers to the terminal D of the switch M1, and to assign, within a region 861 as illustrated in FIG. 8B, another group of the one of the interconnection layers to the terminal D of the switch M2.

For illustration, as shown in FIG. 8A, the predetermined description 800 includes coding portions 801 and 802. The coding portion 801 specifies that the group M1_A of the metal layer Metal-1 is assigned to the terminal D of the switch M1 within the region 860 by using the parameter "around 0.1 um." The parameter "around 0.1 um" specifies that the area of the region 860 is about $0.1*0.1$ um$^2$. As shown in FIG. 8B, in some embodiments, the central position of the region 860 is set to a crossing point of the gate region 240C and the oxide definition region 240A of the switch M1.

The coding portion 802 specifies that the group M1_B of the metal layer Metal-1 is assigned to the terminal D of the switch M2 within the region 861 by using the parameter "around 0.1 um." Accordingly, it is specified that the area of the region 861 is about $0.1*0.1$ um$^2$. In some embodiments, the central position of the region 861 is set to a crossing point of the gate region 240D and the oxide definition region 240B of the switch M2.

Compared with FIG. 5B, the processor 110 extracts the layout patterns within the regions 860 and 861. For illustration, as shown in FIG. 8B, the processor 110 sequentially extracts the layout patterns connected from the terminal D of the switch M1 to the terminal D of the switch M2 within the region 860, as illustrated in a portion 841 of the layout patterns 840. The processor 110 sequentially extracts the layout patterns connected from the terminal D of the switch M2 to the terminal D of the switch M1 within the region 861, as illustrated in a portion 842 of the layout patterns 840. The processor 110 further compares the coding portion 801 in FIG. 8A with the portion 841 in FIG. 8B, and compares the coding portion 802 in FIG. 8A with the portion 842 in FIG. 8B. Thus, the processor 110 is able to determine whether the layout design 240 meets the layout constraints defined in the predetermined description 800.

Figure 9A:
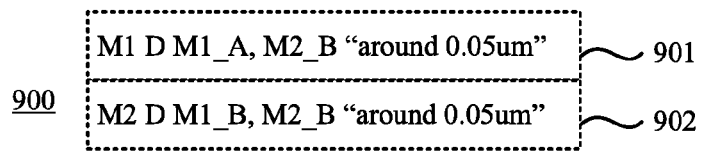
FIG. 9A illustrates a predetermined description including layout constraints for the circuit in FIG. 2A, in accordance with still alternative embodiments of the present disclosure.
Figure 9B:
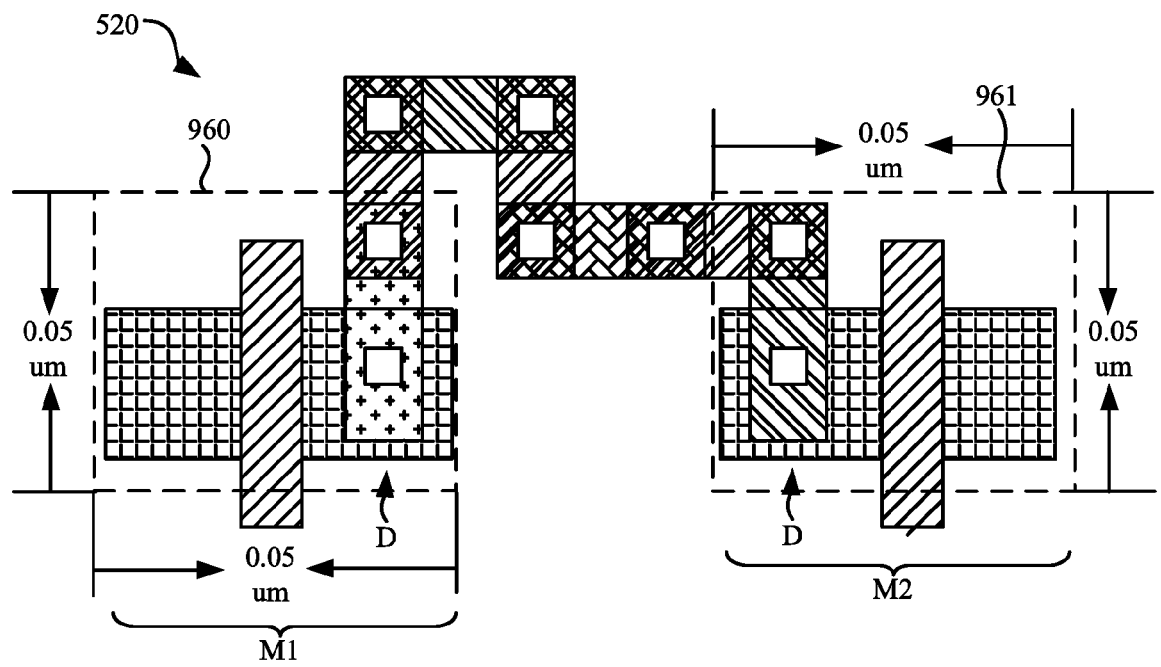
FIG. 9B is a schematic diagram illustrating the layout design in FIG. 5B and layout patterns of the layout design, in accordance with various embodiments of the present disclosure.
Figure 9B:
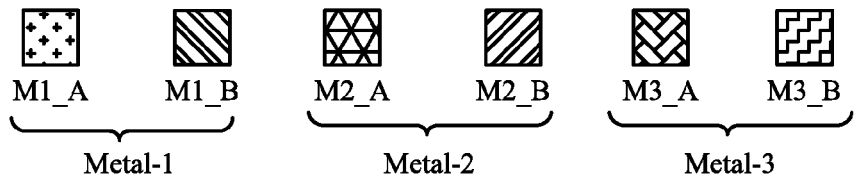
Figure 9B:
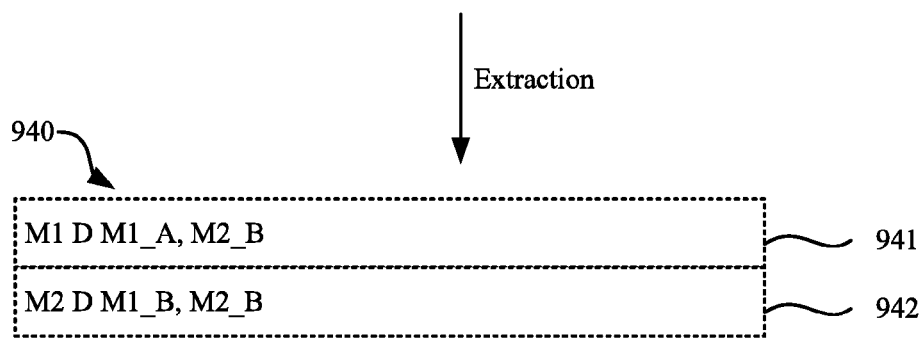

Reference is now made to FIG. 9A and FIG. 9B. FIG. 9A illustrates a predetermined description 900 including layout constraints for the circuit 200 in FIG. 2A, in accordance with still alternative embodiments of the present disclosure. FIG. 9B is a schematic diagram illustrating the layout design 520 in FIG. 5B, and layout patterns 940 of the layout design 520, in accordance with still alternative embodiments of the present disclosure.

Compared with FIG. 8A, in some embodiments, the layout constraints are configured to sequentially assign, within a region 960 as illustrated in FIG. 9B, groups of the interconnection layers to the terminal D of the switch M1, and to sequentially assign, within a region 961 as illustrated in FIG. 9B, groups of the interconnection layers to the terminal D of the switch M2.

For illustration, as shown in FIG. 9A, the predetermined description 900 includes coding portions 901 and 902. The coding portion 901 specifies that the group M1_A and the group M2_B within the region 960 having an area of about 0.05*0.05 um2 are sequentially coupled, in a predetermined sequence, to the terminal D of the switch M1. With such constraints, the terminal D of the switch M1 is expected to be coupled to the group M1_A, and coupled to the group M2_B through the group M1_A within the region 960. The coding portion 902 specifies that the group M1_B and the group M2_B within the region 961 having an area of about 0.05*0.05 um2 are coupled, in a predetermined sequence, to the terminal D of the switch M2. With such constraints, the terminal D of the switch M2 is expected to be coupled to the group M1_B, and coupled to the group M2_B through the group M1_B within the region 961.

Furthermore, the processor 110 sequentially extracts the layout patterns within the regions 960 and 961. For illustration, as shown in FIG. 9B, the processor 110 sequentially extracts the groups in the layout patterns connected from the terminal D of the switch M1 to the terminal D of the switch M2 within the region 960, as illustrated in a portion 941 of the layout patterns 940. The processor 110 sequentially extracts the groups in the layout patterns connected from the terminal D of the switch M2 to the terminal D of the switch M1 within the region 961, as illustrated in a portion 942 of the layout patterns 940. The processor 110 further compares the coding portion 901 with the portion 941, and compares the coding portion 902 with the portion 942. Thus, the processor 110 is able to determine whether the layout design 520 meets the layout constraints defined in the predetermined description 900.

Figure 10A:
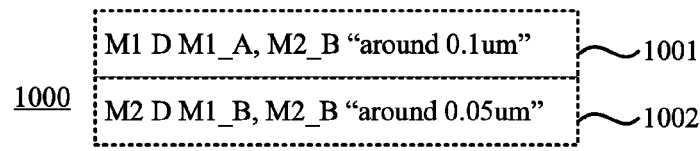
FIG. 10A illustrates a predetermined description including layout constraints for the circuit in FIG. 2A, in accordance with still various embodiments of the present disclosure.
Figure 10B:
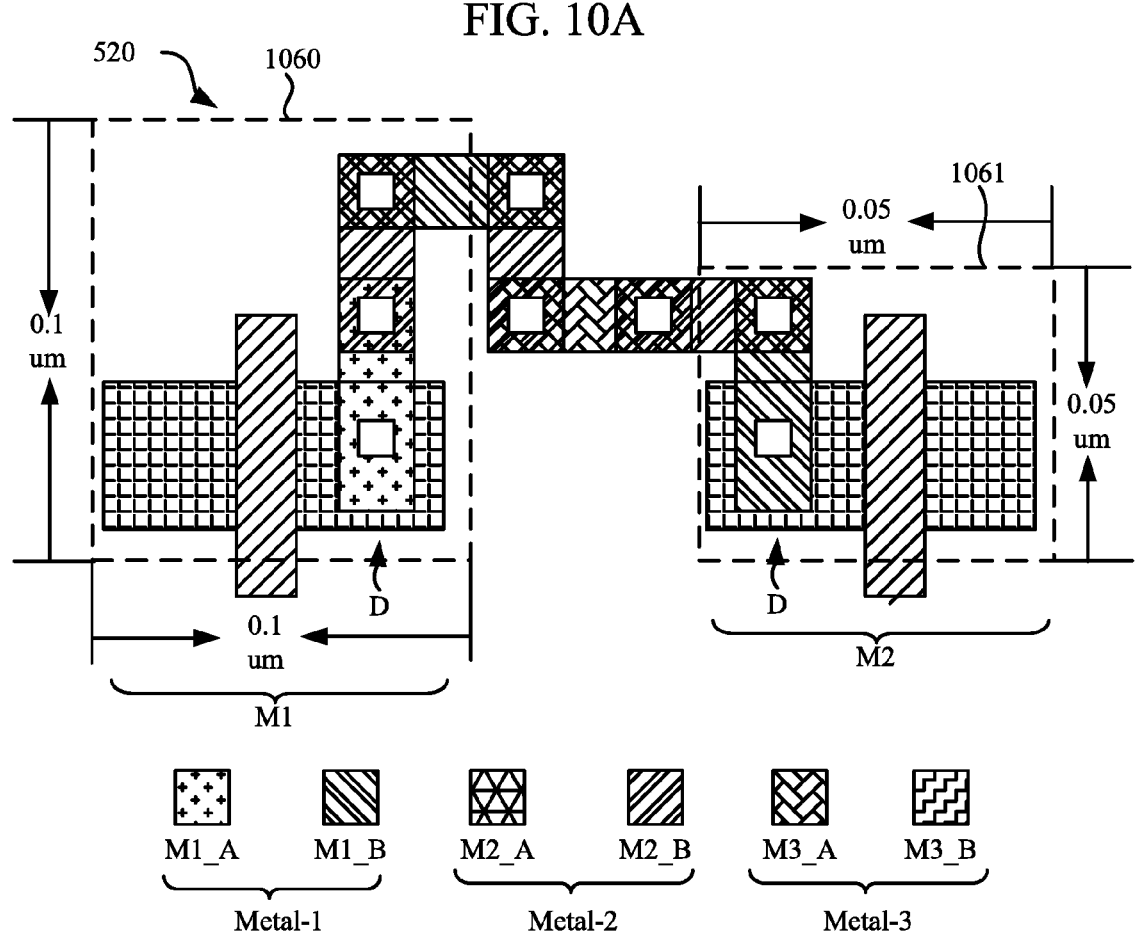
FIG. 10B is a schematic diagram illustrating the layout design in FIG. 5B and layout patterns of the layout design, in accordance with still various embodiments of the present disclosure.
Figure 10B:
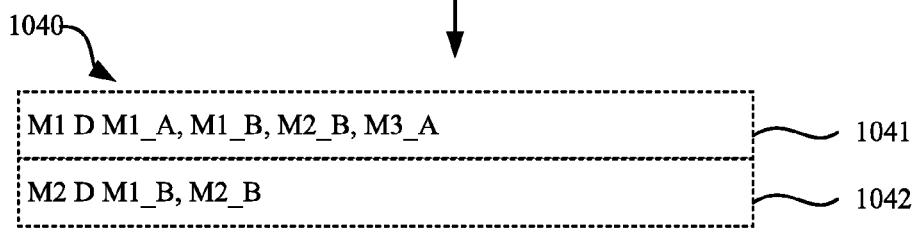

Reference is now made to FIG. 10A and FIG. 10B. FIG. 10A illustrates a predetermined description 1000 including layout constraints for the circuit 200 in FIG. 2A, in accordance with still various embodiments of the present disclosure. FIG. 10B is a schematic diagram illustrating the layout design 520 in FIG. 5B, and layout patterns 1040 of the layout design 520, in accordance with still various embodiments of the present disclosure.

Compared with FIG. 9A, in some embodiments, the layout constraints are configured to assign, in ascending numerical order within a region 1060 as illustrated in FIG. 10B, groups of the interconnection layers to the terminal D of the switch M1. The layout constraints are further configured to assign, in ascending numerical order within a region 1061 as illustrated in FIG. 10B, groups of the interconnection layers to the terminal D of the switch M2.

For illustration, as shown in FIG. 10A, the predetermined description 1000 includes coding portions 1001 and 1002. The coding portion 1001 specifies that the group M1_A and the group M2_A within the region 1060 having an area of about $0.1*0.1$ um$^2$ are sequentially assigned to the terminal D of the switch M1. The coding portion 1002 specifies that the group M1_B and the group M2_B within the region 1061 having an area of about $0.05*0.05$ um$^2$ are sequentially assigned to the terminal D of the switch M2.

Furthermore, the processor 110 determines the top groups of the interconnection layers within the regions 1060 and 1061, respectively. For illustration in FIG. 10B, the top group of the interconnection layers within the region 1060 is the group M3_A, and the top group of the interconnection layers within the region 1061 is the group M2_B. The processor 110 extracts the groups in the layout patterns connected from the terminal D of the switch M1 to the top group M3_A. Then, the processor 110 sorts the groups in the layout patterns in ascending numerical order, as illustrated in a portion 1041 of the layout patterns 1040. As shown in FIG. 10B, the terminal D of the switch M1 is coupled to the top group M3_A through the groups M1_A, M1_B, and M2_B. The processor 110 sorts these groups in ascending numerical order, as illustrated in the portion 1041.

The processor 110 also generates a portion 1042 of the layout patterns 1040 by extracting the groups in the layout patterns connected from the terminal D of the switch M2 to the top group M2_B. The processor 110 then sorts the groups in the layout patterns in ascending numerical order, as illustrated in the portion 1042. Accordingly, the processor 110 is able to compare the coding portions 1001 and 1002 in FIG. 10A with the portions 1041 and 1042 in FIG. 10B, respectively, to check whether the layout design 520 meets the layout constraints.

Figure 11A:
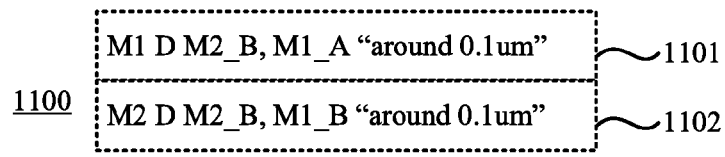
FIG. 11A illustrates a predetermined description including layout constraints for the circuit in FIG. 2A, in accordance with other various embodiments of the present disclosure.
Figure 11B:
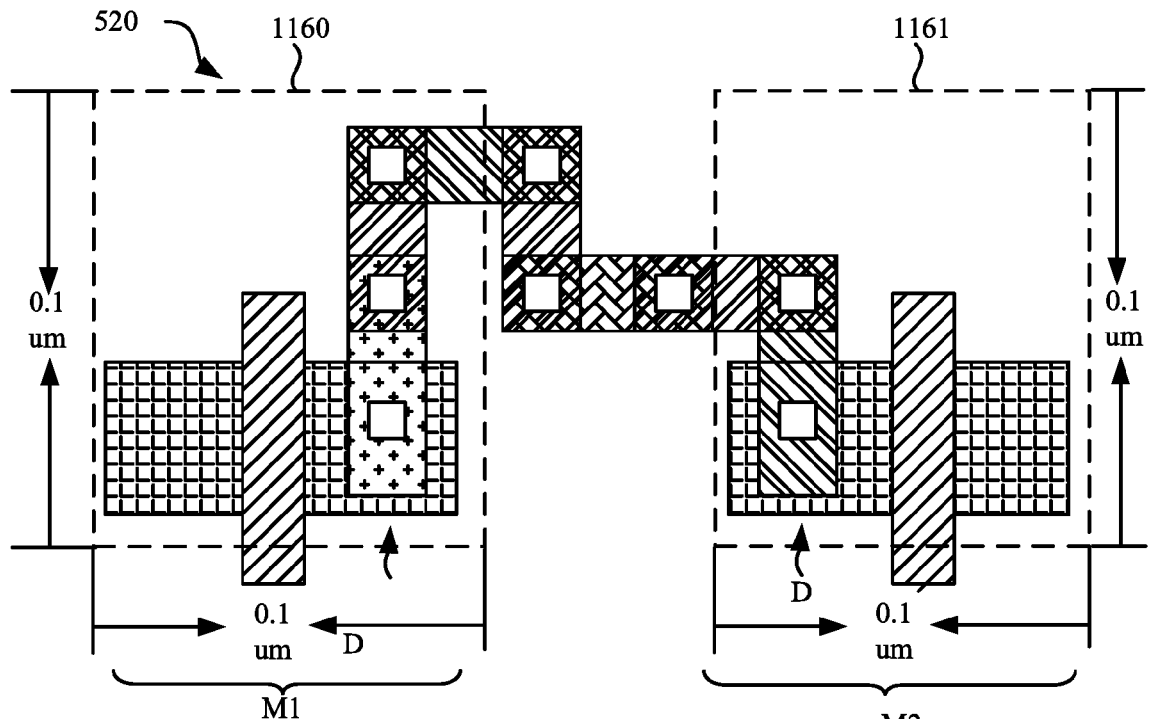
FIG. 11B is a schematic diagram illustrating the layout design in FIG. 5B and layout patterns of the layout design, in accordance with other various embodiments of the present disclosure.
Figure 11B:
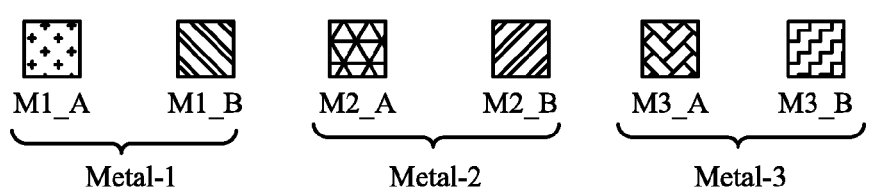
Figure 11B:
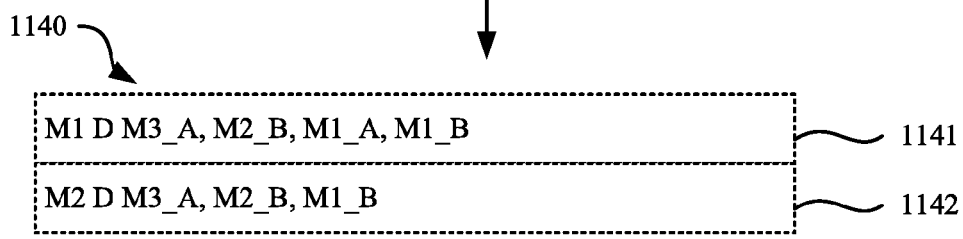

Reference is now made to FIG. 11A and FIG. 11B. FIG. 11A illustrates a predetermined description 1100 including layout constraints for the circuit 200 in FIG. 2A, in accordance with other various embodiments of the present disclosure. FIG. 11B is a schematic diagram the layout design 520 in FIG. 5B, and layout patterns 1140 of the layout design 520, in accordance with other various embodiments of the present disclosure.

In some embodiments, the layout constraints are configured to assign, in descending numerical order within a region 1160 as illustrated in FIG. 11B, groups of the interconnection layers to the terminal D of the switch M1. The layout constraints are further configured to assign, in descending numerical order within a region 1161 as illustrated in FIG. 11B, groups of the interconnection layers to the terminal D of the switch M2.

For illustration, as shown in FIG. 11A, the predetermined description 1100 includes coding portions 1101 and 1102. The coding portion 1101 specifies that the group M2_B and the group M1_A within the region 1160 having an area of about 0.1*0.1 um² are sequentially assigned to the terminal D of the switch M1. The coding portion 1102 specifies that the group M2_B and the group M1_B within the region 1161 having an area of about 0.1*0.1 um² are sequentially assigned to the terminal D of the switch M2.

Then, the processor 110 determines the top group of the interconnection layers within the regions 1160 and 1161, respectively. For illustration in FIG. 11B, the top group of the interconnection layers within the region 1160 is the group M3_A, and the top group of the interconnection layers within the region 1161 is the group M2_B. Then, the processor 110 extracts the groups in the layout patterns connected from the terminal D of the switch M1 to the top group M3_A in descending order, as illustrated in a portion 1141 of the layout patterns 1140. As shown in FIG. 11B, the terminal D of the switch M1 is coupled to the top group M3_A through the groups M1_A, M2_B, and M1_B. The processor 110 sorts these groups in descending order, as illustrated in the portion 1141.

Similarly, the processor 110 generates a portion 1142 of the layout patterns 1040 by extracting the groups in the layout patterns connected from the terminal D of the switch M2 to the top group M2_B. The processor 110 then sorts the groups in the layout patterns in descending numerical order, as illustrated in the portion 1142. Accordingly, the processor 110 is able to compare the coding portions 1101 and 1102 in FIG. 11A with the portions 1141 and 1142 in FIG. 11B, respectively, to check whether the layout design 520 meets the layout constraints.

The arrangements of the layout constraints illustrated in FIGS. 5A-11A are given for illustrative purposes. Various arrangements of the layout constraints are within the contemplated scope of the present disclosure.

Figure 12:
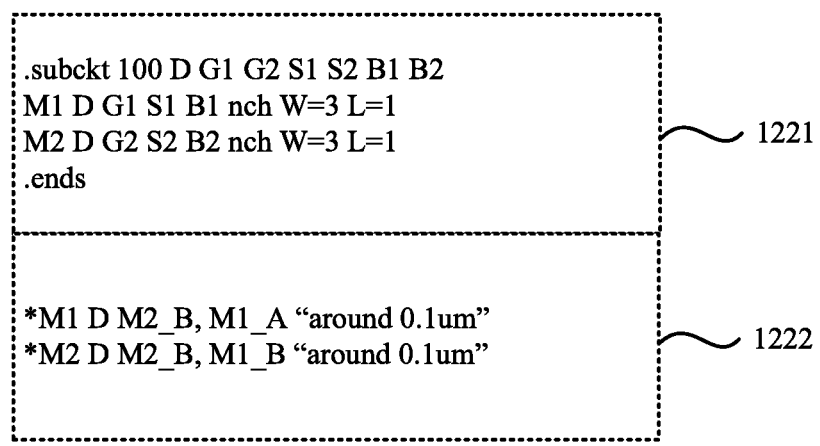
FIG. 12 illustrates a schematic diagram indicating a predetermined description indicating the circuit in FIG. 2A and the layout constraints in a netlist file, in accordance with some embodiments of the present disclosure.

Reference is now made to FIG. 12. FIG. 12 is a schematic diagram illustrates a predetermined description indicating the circuit in FIG. 2A and the layout constraints in a netlist file 1220, in accordance with some embodiments of the present disclosure.

In some embodiments, the predetermined descriptions 500-1100, as illustrated above, are described in an independent file. The independent file is inputted to the design system 100 for extracting the layout constraints. Alternatively, in some other embodiments, the predetermined descriptions 500-1100, as illustrated above, are described in the netlist file including a description of the circuit 200.

For illustration, as shown in FIG. 12, the netlist file 1220 includes two descriptions 1221 and 1222. The description 1221 is configured to describe the circuit 200, as illustrated in the description in the netlist file 220 in FIG. 2B. The description 1222 is configured to describe the layout constraints, for example, as illustrated in FIG. 11A.

The arrangement of the layout constraints in FIG. 12 is given for illustrative purposes. Various arrangements of the layout constraints are within the contemplated scope of the present disclosure.

In various embodiments, the method 300 and the operation S340 thereof are able to be applied to various layout patterns and/or layers, for example, including back end of line (BEOL), middle end of line (MEOL), and/or front end of line (FEOL).

For ease of understanding, the embodiments above are given with an application of fabricating two switches. The embodiments above are able to be applied to fabricate a single switch or two more switches. For illustrative purposes, the embodiments above are described as implementing the switches. The present disclosure is not limited thereto. Various elements are able to be implemented according to the embodiments above, and thus are the contemplated scope of the present disclosure.

In this document, the term "coupled" may also be termed as "electrically coupled," and the term "connected" may be termed as "electrically connected". "Coupled" and "connected" may also be used to indicate that two or more elements cooperate or interact with each other.

In some embodiments, a method that includes the operation below. Groups, indicating layout patterns of interconnection layers, are assigned to a circuit, to determine layout constraints of the circuit. Layout patterns are extracted from a layout design for the circuit. The layout patterns are compared with the layout constraints. Data, indicating the layout design, for fabrication of the circuit are generated in a condition that the layout patterns meet the layout constraints.

Also disclosed is a system that includes a memory and a processor. The memory is configured to store computer program codes. The processor is configured to execute the computer program codes in the memory to extract layout patterns from a layout design for a circuit, extract layout constraints for the circuit, to be compared with the layout patterns, and generate data, indicating the layout design, for fabrication of the circuit in a condition that the layout patterns meet the layout constraints. The layout constraints are configured to assign, in a first predetermined sequence, a plurality of groups, indicating layout patterns of interconnection layers, to the circuit.

Also disclosed is a method that includes the operation below. Groups, indicating layout patterns of interconnection layers, are assigned to a circuit, to determine layout constraints of the circuit, in which a first group of the groups is assigned to a first terminal of a first element in the circuit. Layout patterns are extracted from a layout design for the circuit. The layout patterns are compared with the layout constraints. Data, indicating the layout design, for fabrication of the circuit are generated in a condition that the layout patterns meet the layout constraints.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method, comprising:
assigning a plurality of groups, indicating layout patterns of interconnection layers, to a first terminal and a second terminal of a circuit, to determine layout constraints of the circuit, wherein the first terminal and the second terminal are configured to operate as a single terminal;
extracting a plurality of layout patterns from a layout design for the circuit;
comparing the layout patterns with the layout constraints;
generating data indicating the layout design, for fabrication of the circuit in a condition that the layout patterns meet the layout constraints; and
initiating generation of an integrated circuit from the data, wherein at least one of operations of assigning, extracting, comparing, performing, or initiating is performed by at least one processor.

2. The method of claim 1, wherein a first group of the groups is assigned to the first terminal in the circuit, and assigning the groups comprises:
assigning, in a first predetermined sequence, at least one group, comprising the first group, of the groups to the first terminal.

3. The method of claim 2, wherein the at least one group is further assigned within a first region of a first element of the circuit, and the first terminal is a terminal of the first element.

4. The method of claim 2, wherein a second group of the groups is assigned to the second terminal in the circuit, and assigning the groups further comprises:
assigning, in a second predetermined sequence, at least one group, comprising the second group, of the groups to the second terminal.

5. The method of claim 1, wherein a first group of the groups is assigned to the first terminal in the circuit, and assigning the groups comprises:
assigning, to the first terminal, a first number of the groups to be coupled in a predetermined sequence to a top group of the groups, wherein the first number of the groups comprises the first group.

6. The method of claim 5, wherein a second group of the groups is assigned to the second terminal, and assigning the groups further comprises:
assigning, to the second terminal, a second number of the groups to be coupled in the predetermined sequence to the top group, wherein the second number of the groups comprises the second group.

7. The method of claim 6, wherein the first number of the groups is further assigned within a first region of a first element of the circuit, the first terminal is a terminal of the first element, the second number of the groups is further assigned within a second region of a second element of the circuit, and the second terminal is a terminal of the second element.

8. The method of claim 1, wherein a first group of the groups is assigned to the first terminal, and assigning the groups comprises:
assigning, within a first region of a first element in the circuit, at least one group, comprising the first group, of the groups to be coupled to the first terminal,
wherein the first terminal is a terminal of the first element.

9. The method of claim 8, wherein a second group of the groups is assigned to the second terminal, and assigning the groups further comprises:
assigning, within a second region of a second element in the circuit, at least one group, comprising the second group, of the groups, to be coupled to the second terminal,
wherein the second terminal is a terminal of the second element.

10. The method of claim 8, wherein extracting the layout patterns from the layout design comprises:
extracting at least one layout pattern, within the first region, of the layout patterns from the layout design.

11. A system, comprising:
a memory configured to store computer program codes; and
a processor configured to execute the computer program codes in the memory to:
extract a plurality of layout patterns from a layout design for a circuit;
extract layout constraints for the circuit, to be compared with the layout patterns,
wherein the layout constraints are configured to assign, in one or more predetermined sequences, a plurality of groups, indicating layout patterns of interconnection layers, to a plurality of terminals of the circuit, wherein the plurality of terminals are configured to operate as a single terminal;
generate data, indicating the layout design, for fabrication of the circuit in a condition that the layout patterns meet the layout constraints; and
initiate generation of an integrated circuit from the data.

12. The system of claim 11, wherein a first group of the groups is assigned to a first terminal of the plurality of terminals, and the layout constraints are configured to assign, in a first predetermined sequence of the one or more predetermined sequences, at least one group, comprising the first group, of the groups to the first terminal.

13. The system of claim 12, wherein a second group of the groups is assigned to a second terminal of the plurality of terminals, and the layout constraints are configured to assign, in a second predetermined sequence of the one or more predetermined sequences, at least one group, comprising the second group, of the groups to the second terminal.

14. The system of claim 12, wherein the at least one group is further assigned within a first region of a first element of the circuit, and the first terminal is a terminal of the first element.

15. The system of claim 11, wherein a first group of the groups is assigned to a first terminal of the plurality of terminals, a second group of the groups is assigned to a second terminal of the plurality of terminals, and the layout constraints are configured to assign, to the first terminal, a first number of the groups to be coupled in a first predetermined sequence of the one or more predetermined sequences to a top group of the groups, and to assign, to the second terminal, a second number of the groups to be coupled in the first predetermined sequence to the top group, wherein the first number of the groups comprises the first group, and the second number of the groups comprises the second group.

16. The system of claim 15, wherein the first number of the groups is further assigned within a first region of a first element of the circuit, the first terminal is a terminal of the first element, the second number of the groups is further assigned within a second region of a second element of the circuit, and the second terminal is a terminal of the second element.

17. The system of claim 11, wherein a first group of the groups is assigned to a first terminal of the plurality of terminals, a second group of the groups is assigned to a second terminal of the plurality of terminals, the circuit comprises a first element and a second element, the first terminal is a terminal of the first element, the second terminal is a terminal of the second element, and the layout constraints are configured to assign, within a first region of the first element, at least one group, comprising the first group, of the groups to be coupled to the first terminal, and to assign, within a second region of the second element, at least one group, comprising the second group, of the groups, to be coupled to the second terminal.

18. A method, comprising:

assigning a plurality of groups, indicating layout patterns of interconnection layers, to a plurality of terminals of a circuit, to determine layout constraints of the circuit, wherein the plurality of terminals are terminals of different elements of the circuit and are configured to operate as a single terminal of the circuit;

extracting a plurality of layout patterns from a layout design for the circuit;

comparing the layout patterns with the layout constraints;

generating data, indicating the layout design, for fabrication of the circuit in a condition that the layout patterns meet the layout constraints; and initiating generation of an integrated circuit from the data, wherein at least one of operations of assigning, extracting, comparing, performing, or initiating is performed by at least one processor.

19. The method of claim 18, wherein assigning the groups comprises:

assigning, in a predetermined sequence, at least one group of the groups to a first terminal of the plurality of terminals.

20. The method of claim 18, wherein assigning the groups comprises:

assigning, within a first region of a first element of the circuit, at least one group of the groups to be coupled to a first terminal of the plurality of terminals.

* * * * *